United States Patent
Scheibel et al.

(10) Patent No.: US 7,714,086 B2
(45) Date of Patent: May 11, 2010

(54) POLYVINYL ALCOHOL CO-POLYMER, AND WATER-SOLUBLE FILMS AND POUCHES FORMED THEREFROM

(75) Inventors: Jeffrey John Scheibel, Loveland, OH (US); Lon Montgomery Gray, Florence, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 11/064,202

(22) Filed: Feb. 23, 2005

(65) Prior Publication Data

US 2006/0189772 A1    Aug. 24, 2006

(51) Int. Cl.
C08F 2/00 (2006.01)
C08F 18/00 (2006.01)
C08F 118/02 (2006.01)
C08F 20/06 (2006.01)
C08F 216/02 (2006.01)
C08F 226/02 (2006.01)

(52) U.S. Cl. ............... 526/193; 526/217; 526/236; 526/320; 526/319; 526/317.1; 526/303.1; 526/307.6; 526/307.5

(58) Field of Classification Search ............. 526/193, 526/217, 236, 320, 317.1, 303.1, 307.6, 307.5, 526/319
See application file for complete search history.

(56) References Cited

U.S. PATENT DOCUMENTS

| 4,144,388 | A | * | 3/1979 | Yatsu et al. | ............ 525/61 |
| 4,328,119 | A | * | 5/1982 | Iwasaki et al. | ............ 264/4.7 |
| 6,787,512 | B1 | | 9/2004 | Verrall et al. | |
| 2002/0182348 | A1 | * | 12/2002 | Fujiwara et al. | ............ 428/35.2 |

FOREIGN PATENT DOCUMENTS

| EP | 0 291 198 A2 | 11/1988 |
| EP | 1 251 147 A1 | 10/2002 |
| JP | 03-203940 | * 9/1991 |
| JP | 06 065463 A2 | 3/1994 |

OTHER PUBLICATIONS

European Search Report, Application No. 04077079.4-2109-, dated Dec. 16, 2004, 5 pages.

* cited by examiner

*Primary Examiner*—William K Cheung
(74) *Attorney, Agent, or Firm*—Julia A. McConihay; Armina E. Matthews; Kim W. Zerby

(57) ABSTRACT

Polyvinyl alcohol co-polymers comprising co-monomers of carboxylic acid and carboxylic acid derivatives wherein the co-polymers further comprise an amino functional monomer, and water-soluble films and pouches formed therefrom.

12 Claims, No Drawings

POLYVINYL ALCOHOL CO-POLYMER, AND WATER-SOLUBLE FILMS AND POUCHES FORMED THEREFROM

CROSS REFERENCE TO RELATED APPLICATION

This application claims the benefit of U.S. Provision Application No. 60/500 417, filed on Sep. 5, 2003.

The present invention relates to polyvinyl alcohol co-polymer comprising carboxylic acid and their derivatives. Adjacent carboxylic acids and esters may form lactones which adversely affect solubility characteristics.

GB-A-2,090,603, published on Jul. 14, 1982, addresses the problem by blending a polyacrylic acid with the polymer. This results in hydrogen bonding between the polyacrylic acid and polyvinyl alcohol. The hydrogen bonded structure interferes sterically and electronically with continuing hydrolysis of the polyvinyl alcohol which thereby prevents a higher order crystallinity structure and insolubilisation.

However the blending of co-monomers such as polyacrylic acid with polyvinyl alcohol generally leads to poorer physical properties upon transformation of the co-polymer into a film. In particular, film modulus is adversely affected by polymers comprising polyacrylic acid. Furthermore compatability of the film with certain chemicals may be adversely affected because the ester functionality is a reactive center that can hydrolyse or react with the chemicals.

U.S. Pat. No. 4,885,105, issued on Dec. 5, 1989, discloses films made from polyvinyl alcohol comprising co-monomers of carboxylic acid and carboxylic acid derivatives. It is noted that alkaline hydroxides including tetraethanol and tetraethyl ammonium hydroxide convert lactones to anionic form when added before, during or after film production.

It is an objective of the present invention to provide a polyvinyl alcohol film comprising co-monomers of carboxylic acid and carboxylic acid derivatives which is resistant to further hydrolysation, and therefore insolubility, and which at the same time retains good film modulus characteristics and resistance to reaction with chemicals.

SUMMARY OF THE INVENTION

This problem is addressed by introducing an amino functional reactant into the co-polymer. Further embodiments of the present invention relate to a water-soluble film comprising the amino-modified polyvinyl alcohol, and to water-soluble liquid-containing pouch comprising the water-soluble film.

DETAILED DESCRIPTION OF THE INVENTION

It has been disclosed in "Polyvinyl Alcohol Developments", Ed. C. A. Finch, John Wiley and Sons, 1992, Chapter 4, that copolymerisation of monocarboxylic vinyl monomers with vinyl acetate does not result in hydrolysed copolymers containing carboxyl groups since adjacent hydroxyl groups react easily with carboxyl groups to form five-membered lactone rings. Dicarboxylic monomers such as maleic, fumaric, and itaconic acids, or corresponding acid anhydrides, are useful comonomers for introducing carboxyl groups into polyvinyl alcohol copolymers. One of the carboxyl groups in the dibasic monomer unit can also react easily with the adjacent hydroxyl group in a hydrolysed copolymer to form a five-membered lactone ring, but the other carboxyl group in the dibasic monomer unit appears to remain unchanged, because of the low steric stability of six-membered or seven-membered lactone rings.

However lactone formation is undesirable in many cases because it adversely affects the solubility properties of the co-polymer. The poor solubility problem may become even more acute when the polyvinyl alcohol comes into contact with certain chemicals which promote lactone formation. Such chemicals are essentially incompatible with polyvinyl alcohol in applications when good water solubility is needed.

The present invention provides a means for disrupting the lactone ring formation by the addition of an amine.

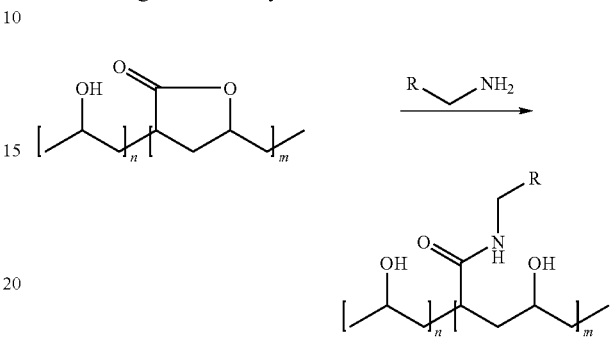

where R is any organic moiety, either substituted or unsubstituted, straight-chain or branched, saturated or unsaturated.

Preferably R—$CH_2NH_2$ is selected from the group consisting of 3-(dimethylamino)propylamine, 3-amino-1-propanol, 3-methoxyethylamine, methoxypropylamine, aminoethoxyethanol, aminopropoxypropanol, aminopropoxypropoxyethanol, 3-amino-1,2-propanediol, aminoethylethanolamine, allylamine, 3-aminopropylsulphonate, 3-aminopropylcarboxylate and mixtures thereof.

Most preferred reactants are 3-(dimethylamino)propylamine, 3-amino-1-propanol, 3-methoxyethylamine.

Di- and tri-ethanolamine fall outside of the scope of the present invention. Monoethanolamine, $HOCH_2$—$CH_2NH_2$, is however useful in the present invention, but is less preferred.

The polyvinyl alcohol co-polymer can have any weight average molecular weight, preferably from about 1000 to 1,000,000, or more preferably from 10,000 to 300,000, or even more preferably from 15,000 to 200,000, or most preferably from 20,000 to 150,000. Mixtures or blends of polymers may be used.

Polyvinyl alcohol is widely used in diverse applications including warp sizing, paper coating, adhesives and film. Highly preferred is polyvinyl alcohol film formed by extrusion, blow-extrusion, blow-molding, extrusion casting or solution casting into a thin film. Such a film is preferably 10 to 200 micrometers thick, more preferably from 40 to 100 micrometers thick.

In a particular embodiment of the present invention a water-soluble pouch containing a liquid is formed which comprises polyvinyl alcohol film. A water-soluble, liquid-containing pouch can be formed with liquids comprising chemicals which would be incompatible with conventional polyvinyl alcohol films.

The water-soluble film herein may comprise other additive ingredients than the polymer or polymer material. For example, it may be beneficial to add plasticisers, for example glycerol, ethylene glycol, diethylene glycol, propylene glycol, propane diol, sorbitol and mixtures thereof, additional water, disintegrating aids, fillers, anti-foaming agents, emulsifying/dispersing agents, and/or antiblocking agents. It may be useful that the pouch or water-soluble film itself comprises a detergent additive to be delivered to the wash water, for example organic polymeric soil release agents, dispersants, dye transfer inhibitors. Optionally the surface of the film of the pouch may be dusted with fine powder to reduce the coefficient of friction. Sodium aluminosilicate, silica, talc and amylose are examples of suitable fine powders.

According to a preferred embodiment of the present invention the water-soluble film is made from a co-polymer which further comprises dicarboxylic acid. Preferably the co-polymer comprises vinyl alcohol and dicarboxylic acid, and it is most preferred that the co-polymer comprises from 0.1 mol % to 30 mol %, especially from 1 mol % to 6 mol %, of the dicarboxylic acid. Suitable dicarboxylic acids are itaconic acid, maleic acid, malonic acid, succinic acid and mixtures thereof. Most preferred is itaconic acid.

The polyvinyl alcohol co-polymers of the present invention may be fully or partially hydrolysed, preferably the polymer is from 60 to 100% hydrolysed, more preferably at least 80% hydrolysed, and most preferably at least 98% hydrolysed.

Process

Incorporation of the amino functionality into the polyvinyl alcohol polymer can be achieved by post-modification, or amidation, of copolymers already comprising polyvinyl alcohol and carboxylic acid can be carried out (formula above) by dissolving copolymer in an excess of the desired amine and recovering copolymer product by swelling out with methanol, followed by drying. Another process involves swelling the copolymer in a co-solvent and reacting it with an equimolar amount of the desired amine. The co-solvent could be ethanol, ethylene glycol, polyalkylene glycols, polyalkylene glycol ethers, glycerin or other solvents whose use is desired in final film casting process. Co-solvent, copolymer mixture is carried on to film casting without co-solvent removal. This co-solvent method is preferred to the use of excess amine in order to minimize the need for recovery of excess amine.

Alternatively copolymerisation can be achieved directly with the appropriately substitututed acryl amide.

Water-Soluble Pouch

In one embodiment of the present invention the film is formed into a closed pouch and the pouch contains a composition which may be in liquid, granular, or some other form. Liquid-filled pouches are particularly preferred. The term "liquid" is used herein to broadly include, for example, mixtures, solutions, dispersions and emulsions, although homogeneous solutions are most preferred. The liquid may be from low to very high viscosities including gels and pastes. The preferred viscosity may be up to 10,000 mPa·s, but it is more preferably from 100 to 1000 mPa·s, and most preferably from 300 to 500 mPa·s. The liquid may contain active ingredients suitable for various applications. Examples of such applications are agrochemicals, e.g. pesticides, herbicides, fungicides, insecticides; industrial chemicals, e.g. materials used in construction industries, materials used in photography, printing and textile industries; chemicals for treating water, e.g. swimming pools, water heating systems, sewage and drainage systems; health and beauty care products, e.g. pharmaceutical and cosmetic applications; domestic and consumer products, e.g. laundry cleaning and treatment, dish and hard surface cleaning, shampoo, bath additives. Particularly preferred liquids are suitable for use as liquid detergents in the cleaning of clothes, dishes, and other household surfaces.

The liquid composition preferably has a density of 0.8 kg/l to 1.3 kg/l, preferably about 1.0 to 1.1 kg/l. The liquid composition can be made by any method and can have any viscosity, typically depending on its ingredients. The viscosity may be controlled, if desired, by using various viscosity modifiers such as hydrogenated castor oil and/or solvents. Hydrogenated castor oil is commercially available as Thixcin®. Suitable solvents are described in more detail below.

The liquid compositions of the present invention are concentrated and contain relatively low levels of water. The liquid compositions comprise less than 25% by weight water, and preferably between 5-15% by weight water. However, suitable compositions may even comprise less than 5% by weight water.

The liquid of the present invention preferably has a pH of less than 9, preferably less than 8, more preferably less than 7.5, when measured by dissolving the liquid to a level of 1% in an aqueous medium.

Preferred Ingredients of the Liquid Composition

The preferred amounts of ingredients described herein are % by weight of the composition herein as a whole.

If the liquid composition is a detergent composition, it is preferred that at least a surfactant and builder are present, preferably at least anionic surfactant and preferably also nonionic surfactant, and preferably at least a builder, more preferably at least a water-soluble builder such as phosphate builder and/or fatty acid builder. Other preferred components are chelating agents, enzymes and/or bleaching agents, such as a preformed peroxyacid.

Highly preferred are also perfume, brightener, buffering agents (to maintain the pH preferably from 5.5 to 9, more preferably 6 to 8, most preferably about 7.5), fabric softening agents, including clays and silicones benefit agents, suds suppressors.

In hard-surface cleaning compositions and dish wash compositions, it is preferred that at least a water-soluble builder is present, such as a phosphate, and preferably also surfactant, perfume, enzymes, bleach.

In fabric enhancing compositions, preferably at least a perfume and a fabric benefit agent are present for example a cationic softening agent, or clay softening agent, anti-wrinkling agent, fabric substantive dye.

Highly preferred in all above compositions are also additional solvents, such as alcohols, diols, monoamine derivatives, glycerol, glycols, polyalkylane glycols, such as polyethylene glycol, propane diol, monoethanolamine. Highly preferred are mixtures of solvents, such as mixtures of alcohols, mixtures of diols and alcohols, mixtures. Highly preferred may be that (at least) an alcohol, diol, monoamine derivative and preferably even glycerol are present. The compositions of the invention are preferably concentrated liquids having preferably less than 50% or even less than 40% by weight of solvent (other than water), preferably less than 30% or even less than 20% or even less than 35% by weight. Preferably the solvent is present at a level of at least 5% or even at least 10% or even at least 15% by weight of the composition.

Highly preferred is that the composition comprises a plasticiser for the water-soluble pouch material, for example one of the plasticisers described above, for example glycerol. Such plasticisers can have the dual purpose of being a solvent for the other ingredients of the composition and a plasticiser for the pouch material.

EXAMPLE 1

A co-polymer of vinyl alcohol and methyl methacrylate, made according to U.S. Pat. No. 3,689,469, Dupont, in which some of the methacrylate groups react with some of the neighboring hydroxyl groups to form lactone groups. The resulting resin was blended in a weight ratio of 10:1 with 3-(dimethylamino)propylamine (DMAPA) 50% in a mixture of equal parts of propylene glycol, glycerin, and ethanol and mixed at 60° C. for 4 hours.

The modified polyvinyl alcohol co-polymer in the co-solvents was then formed into a film by solution casting with additional plasticisers, to a residual water level of about 7%. The resulting film had a thickness of 75 micrometers.

EXAMPLE 2

Example 1 was repeated replacing the methyl methacrylate with itaconic acid.

EXAMPLE 3

A co-polymer of vinyl alcohol and methyl methacrylate, made according to U.S. Pat. No. 3,689,469, Dupont, in which some of the methacrylate groups react with some of the neighbouring hydroxyl groups to form lactone groups. The resulting resin was blended in a weight ratio of 1:1 with 3-(dimethylamino)propylamine (DMAPA). Excess unreacted amine is extracted with methanol and resulting modified copolymer is dried in a vacuum oven.

The modified polyvinyl alcohol co-polymer was then formed into a film by solution casting with additional plasticisers, to a residual water level of about 7%. The resulting film had a thickness of 75 micrometers.

EXAMPLE 4

Example 3 was repeated replacing the methyl methacrylate with itaconic acid.

The invention claimed is:

1. A polyvinyl alcohol co-polymer, comprising the reaction product of (i) a lactone-containing co-polymer formed from vinyl alcohol monomer and carboxylic acid monomer, and (ii) an amino functional reactant, wherein:
   (a) the amino functional reactant opens lactone rings of the lactone-containing co-polymer;
   (b) the polyvinyl alcohol co-polymer comprises from about 1 mol % to about 6 mol % of the amino functional reactant which is selected from the group consisting of 3-(dimethylamino)propylamine, 3-amino-1-propanol, methoxypropylamine, aminoethoxyethanol, aminopropoxypropanol, aminopropoxypropoxyethanol, 3-amino-1,2-propanediol, aminoethylethanolamine, allylamine, 3-aminopropylsulphonate, 3-aminopropylcarboxylate and mixtures thereof; and
   (c) the polyvinyl alcohol co-polymer is water-soluble.

2. A water-soluble film comprising the polyvinyl alcohol copolymer according to claim 1.

3. A water-soluble pouch containing a liquid, wherein the water-soluble pouch is formed of a water-soluble film according to claim 2.

4. A polyvinyl alcohol co-polymer according to claim 1, wherein the lactone-containing co-polymer is formed from a dicarboxylic acid.

5. A polyvinyl alcohol co-polymer according to claim 4, wherein the lactone-containing co-polymer comprises itaconic acid, maleic acid, malonic acid, succinic acid, or a mixture thereof.

6. A polyvinyl alcohol co-polymer according to claim 4, wherein the lactone-containing co-polymer comprises from 0.1 mol % to 30 mol % of the dicarboxylic acid.

7. A polyvinyl alcohol co-polymer according to claim 4, wherein the lactone-containing co-polymer comprises from 1 mol % to 6 mol % of the dicarboxylic acid.

8. A polyvinyl alcohol co-polymer according to claim 1 wherein, the amino functional reactant is selected from the group consisting of 3-(dimethylamino)propylamine, 3-amino-1-propanol, and mixtures thereof.

9. A water-soluble film according to claim 2 wherein the amino functional reactant is selected from the group consisting of 3-dimethylamino)propylamine, 3-amino-1-propanol, and mixtures thereof.

10. A water-soluble film according to claim 2 having a thickness of from about 10 to about 200 micrometers.

11. A water-soluble film according to claim 10 having a thickness of from about 40 to about 100 micrometers.

12. A water-soluble pouch according to claim 3 wherein the amino functional reactant is selected from the group consisting of 3-(dimethylamino)propylamine, 3-amino-1-propanol, and mixtures thereof.

* * * * *